United States Patent [19]

Hirakawa et al.

[11] Patent Number: 5,439,300
[45] Date of Patent: Aug. 8, 1995

[54] ROLLING BEARING

[75] Inventors: Kiyoshi Hirakawa; Toichi Kondo; Shigeru Okita, all of Kanagawa, Japan

[73] Assignee: NSK Ltd., Tokyo, Japan

[21] Appl. No.: 202,481

[22] Filed: Feb. 28, 1994

[30] Foreign Application Priority Data

Feb. 26, 1993 [JP] Japan .................. 5-038857
Aug. 31, 1993 [JP] Japan .................. 5-216748

[51] Int. Cl.6 ............................................ F16C 19/00
[52] U.S. Cl. .................... 384/625; 384/492; 384/912
[58] Field of Search ............ 384/625, 912, 492, 565, 384/913, 907.1

[56] References Cited

U.S. PATENT DOCUMENTS

| | | | |
|---|---|---|---|
| 5,137,375 | 8/1992 | Murakami et al. | 384/450 |
| 5,261,975 | 11/1993 | Sorstrom et al. | 384/912 |
| 5,292,200 | 3/1994 | Matsumoto et al. | 384/625 |
| 5,352,303 | 10/1994 | Murakami et al. | 384/912 |

FOREIGN PATENT DOCUMENTS

| | | |
|---|---|---|
| 1590113 | 3/1978 | United Kingdom . |
| 2209058 | 4/1989 | United Kingdom . |
| 2244103 | 11/1991 | United Kingdom . |

OTHER PUBLICATIONS

HTM 47 (1992) 4, pp. 223–230.

*Primary Examiner*—Lenard A. Footland
*Attorney, Agent, or Firm*—Sughrue, Mion, Zinn, Macpeak & Seas

[57] ABSTRACT

An object of this invention is to provide a rolling bearing having an inner race which can be used under a high fitting stress over 130 MPa, and can be processed more quickly than the conventional one. In a rolling bearing, according to the present invention, including an inner race which is used with a fitting stress applied between bore of said inner race and shaft, the inner race is formed by an alloy steel whose carbon content is ranged from 0.3 to 0.7% by weight, the inner race is subjected to a carburizing or carbonitriding treatment, and the carbon content ($C_1$) of the surface layer of the raceway track of the inner race is at most 1.3% by weight, and the inner race has the difference ($\Delta C = C_1 - C_2$) between the carbon content ($C_1$) of the surface layer and the carbon content ($C_2$) of the core of the inner race being at least 0.4% by weight. When the amount of residual austenite of the inner race is 4.0 vol % or less and the hardness of the raceway track is Hv 720 or more, the inner race is high in dimensional stability, and its life-time with a foreign-matter-mixed high-temperature lubricant is increased.

8 Claims, 5 Drawing Sheets

1

ROLLING BEARING

BACKGROUND OF THE INVENTION

This invention relates to a rolling bearing which is used with fitting stress applied to the inner race made of alloy steel (the stress being the average of the tensile force in the section of the inner race which is applied to the latter circumferentially thereof), and in which the inner race is long in service life and is simultaneously prevented from being cracked even when used under high fitting stress.

In addition, this invention also relates to a rolling bearing which is long in service life even when used with a foreign-matter-mixed high-temperature lubricant, and in which the inner race is high in dimensional stability.

For instance, an automatic self-aligning roller bearing used for a paper machine is sometimes used under a high fitting stress over 100 MPa, to prevent the inner race and the shaft from creeping. In order to apply the fitting stress with ease, the inner race whose inner cylindrical surface is tapered, is press-fitted on the tapered shaft. In general, the inner race thus shaped is made of completely hardened steel such as high carbon chromium bearing steel (containing about 1% C by weight and about 1.5% Cr by weight) which is hardened and tempered.

When the bearing is used with a fitting stress over 100 MPa applied to the inner race of completely hardened steel, the fitting stress and the rolling stress in combination may crack the inner race axially if a non-metallic foreign matter is located near the raceway track.

In order to eliminate this difficulty, heretofore the following methods are employed which are based on the general technical knowledge that it is most effective to increase the compression residual stress of the raceway track or to increase the fracture toughness of the material itself: That is, the completely hardened steel is subjected to austempering, or carburized steel is employed, to increase the compression residual stress of the raceway track.

However, the above-described methods suffers from the following problems:

That is, the method of austempering the completely hardened steel is disadvantageous in the following point: With the method, the compression residual stress which can be applied to the raceway track is about $-100$ MPa. Therefore, in the case where the inner race is used under a high fitting stress higher than 130 MPa, it is impossible to prevent the inner race from being cracked.

The method of employing the carburized steel is effective in preventing the cracking of the inner race which is used under a fitting stress over 130 MPa, because a compression residual stress of the order of $-200$ MPa may be applied to the raceway track by controlling the conditions of carburizing, hardening and tempering. However, the method is still disadvantageous in that, in the case where a steel material small in carbon content, about 0.20% by weight, is carburized, the carburizing operation takes a relatively long time period.

On the other hand, the carburizing time is proportional to the square of the carburizing depth. Hence, middle and large bearings requiring a deeper carburized layer are lower in productivity; that is, they are unavoidably higher in manufacturing cost.

Further, when the inner race which is used under a high fitting stress is particularly used in a high temperature lubricant mixed with foreign matters (hereinafter referred to as "foreign-matter-mixed high-temperature lubricant", when applicable), there is a problem in which the dimensional stability and the service life thereof is further getting worse.

When high carbon chromium bearing steel or carburized steel is tempered at 230° C. or higher, the amount of residual austenite is decreased, so that its dimensional expansion with time is prevented, while the martensite is sufficiently tempered, so that its dimensional contraction with time is prevented; however, the surface hardness is decreased. Hence, when an inner race which is heat-treated as described above is used to fabricate a rolling bearing, the rolling bearing is insufficient in the hardness of the raceway track, and its rolling life is decreased when used with foreign-matter-mixed high-temperature lubricant.

SUMMARY OF THE INVENTION

In view of the foregoing, an object of a first aspect of this invention is to provide a rolling bearing having an inner race which can be used under a high fitting stress over 130 MPa, and can be processed more quickly than the conventional one, and has long rolling life.

The foregoing object of the invention has been achieved by the provision of a rolling bearing including an inner race which is used with a fitting stress applied between bore of said inner race and shaft, in which, according to the invention,

- at least the inner race is formed by an alloy steel whose carbon content is ranged from 0.3 to 0.7% by weight;
- the inner race is subjected to a carburizing or carbonitriding; and
- the inner race has the difference ($\Delta C = C_1 - C_2$) between the carbon content ($C_1$) of the surface layer and the carbon content ($C_2$) of the core of the inner race being at least 0.4% by weight.

In addition, in the rolling bearing, the absolute value of compression residual stress of the inner race may be not less than 160 MPa.

Further, in the alloy steel, the carbon content ($C_1$) of the surface layer of the raceway track of the inner race may be at most 1.3% by weight. Furthermore, in the alloy steel, the chromium content in a range of from 0.8% to 3.0% by weight may be contained, the hardness of the raceway track may be ranged from Hv 720 to Hv 760, or the amount of residual austenite of the inner race the may be not more than 4.0 vol %.

Further, it is an object of a second aspect of this invention, in addition to the object of the first aspect of this invention, to provide a rolling bearing having an inner race which is high in dimensional stability and long in the life-time with foreign-matter-mixed high-temperature lubricant.

The object of the second aspect of this invention has been achieved by provision of rolling bearing including inner race in which, in addition to the above-mentioned first aspect of this invention, the amount of residual austenite in the surface layer of the raceway track is made not more than 4.0 vol %, and the hardness of the raceway track is ranged from Hv 720 to Hv 760.

The above-described data are based on the following facts:

(1) The difference ($\Delta C = C_1 - C_2$) between the carbon content ($C_1$) of the surface layer and the carbon content ($C_2$) of the core of the inner race is at least 0.4% by weight:

FIG. 3 is a graphical representation indicating compression residual stress with cracking life-time of an inner race in the case where, with a fitting stress of 200 MPa applied to the raceway track of the inner race to which compression residual stress has been applied by carburizing, the cracking life-time of the inner race is measured. As is apparent from the graphical representation, when the absolute value of compression residual stress of the raceway track is 160 MPa or larger, then the lift-time is considerably long, more than $10^8$ revolutions, and the inner race can be used with high efficiency even under a high fitting stress over 130 MPa.

FIG. 4 is also a graphical representation indicating the relationships between the compression residual stress of the raceway track and the difference $\Delta C$. As is seen from FIG. 4, in order to increase the absolute value of compression residual stress of the raceway track to 160 MPa or higher, it is necessary to set the difference ($\Delta C = C_1 - C_2$) between the carbon content ($C_1$) of the surface layer and the carbon content ($C_2$) of the core of the inner race to at least 0.4% by weight. In FIG. 4, one of the data marked with (x) is such that even when $\Delta C < 0.4\%$ by weight, the absolute value of compression residual value is larger than 160 MPa; however, this is excluded according to another condition described below (the carbon content being 0.3% to 0.7% by weight).

(2) The carbon content of an alloy steel for forming o the inner race is 0.3% to 0.7% by weight:

FIG. 5 is a graphical representation indicating the relationships between the carbon contents of alloy steels employed for inner races and the compression residual stress of the raceway tracks of the inner races which are given to them by carburizing or carbonitriding. As is apparent from FIG. 5, when the carbon content is larger than 0.7% by weight, it is impossible to apply to the raceway track a high compression residual stress the absolute value of which is over 160 MPa.

On the other hand, when the carbon content is increased to 0.3% by weight or larger, then the period of time required for carburizing or carbonitriding can be shortened.

FIG. 6 indicates time periods required for carburizing alloy steels to one and the same depth (C of the surface being 1.0% by weight, and C at a depth of 1 mm being 0.75% by weight) with the different carbon contents of the alloy steels. As is seen from FIG. 6, when the carbon content is smaller than 0.3% by weight, the carburizing time period is considerably long. In FIG. 6, the carburizing time period with a carbon content of 0.2% by weight, is about twice as long as that with a carbon content of 0.3% by weight.

In FIG. 5, the data marked with (O) satisfy both the conditions "the carbon content is 0.3% to 0.7% by weight" and "$\Delta C \geq 0.4\%$ by weight". With the data, the absolute value of compression residual stress is more than 160 MPa, and the carburizing time period is short.

(3) The carbon content ($C_1$) of the surface layer of the raceway track of the inner race is at most 1.3% by weight:

When the carbon content ($C_1$) of the surface layer of the raceway track of the inner race is larger than 1.3% by weight, then large carbides are formed on the raceway track, thus reducing the rolling life-time.

(4) The chromium content of an alloy steel to be used is in a range of from 0.8% to 3.0% by weight:

In order to improve the wear resistance, it is preferable to use an alloy steel whose chromium content is at least 0.8% by weight (Table 2). On the other hand, if the amount of chromium contained in the alloy steel is larger than 3.0 (particularly, 3.5%) by weight, larger carbides are formed on the raceway track, thus lowering the rolling life of the inner race (Table 2).

(5) The amount of residual austenite of the inner race is 4.0 vol % or less:

When the amount of residual austenite $\gamma_R$ is 4.0 vol % or less, the dimension variation rate is within $\pm 0.010\%$, and the dimensional stability is satisfactory, meeting the thermal stability code 27 of ISO Standard (FIG. 7).

(6) The hardness of the raceway track is ranged from Hv 720 to Hv 760:

when the hardness is larger than Hv 720, the life-time with the foreign-matter-mixed high-temperature lubricant is $2.0 \times 10^6$ cycles or more which is large enough for the rolling bearing in practical use (FIG. 8). The upper limit of the raceway track hardness, Hv 760, has been selected, because it is difficult to exceed the hardness Hv 760 with the materials of the invention.

BRIEF DESCRIPTION OF THE DRAWING(S)

DETAILED DESCRIPTION OF THE PREFERRED EMBODIMENTS

Preferred embodiments of this invention will be described with reference to its concrete examples in detail.

First Embodiment

Figure 1:
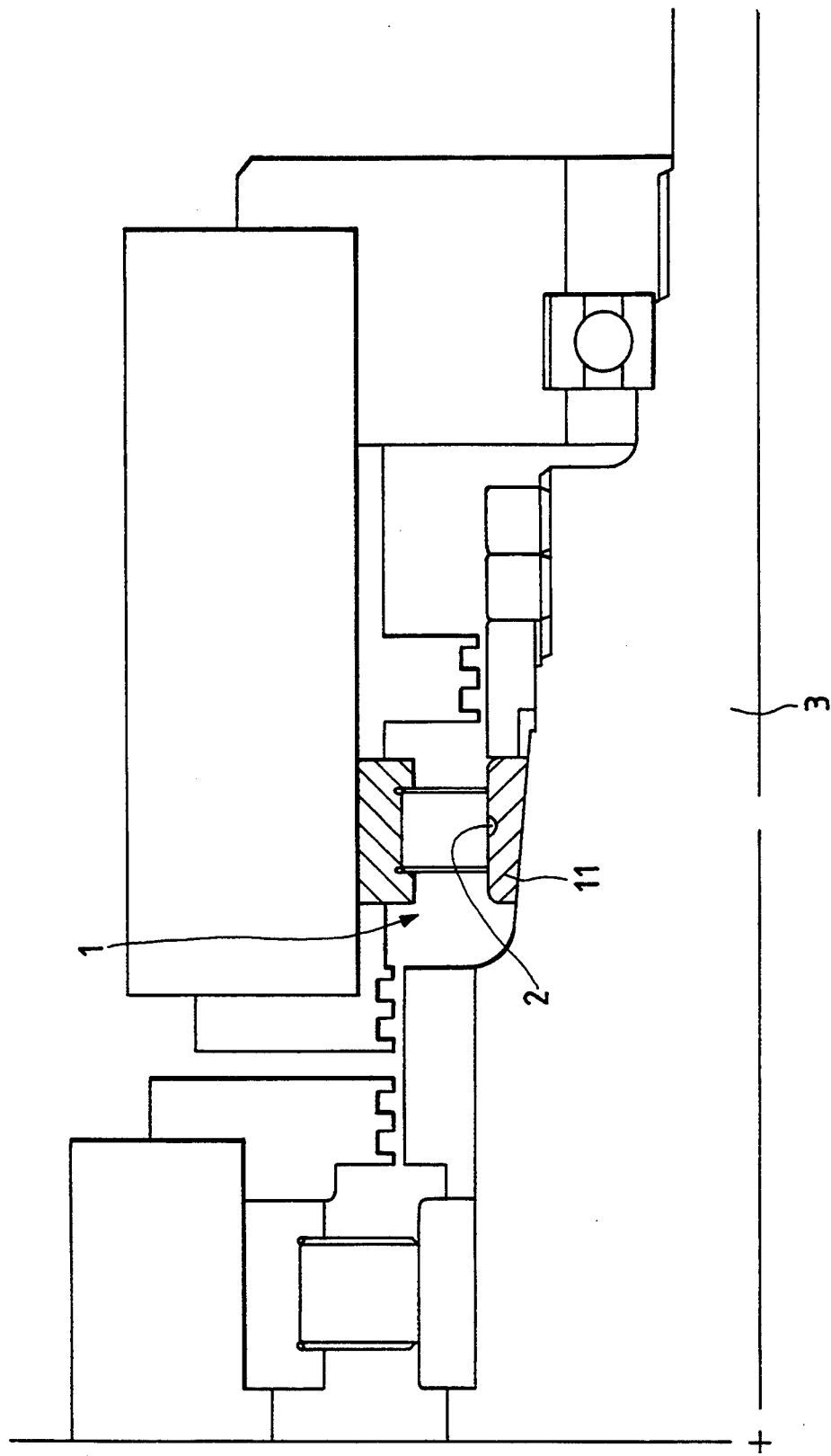
FIG. 1 is a diagram outlining an inner race cracking life-time tester employed in embodiments of the invention.
Figure 2:
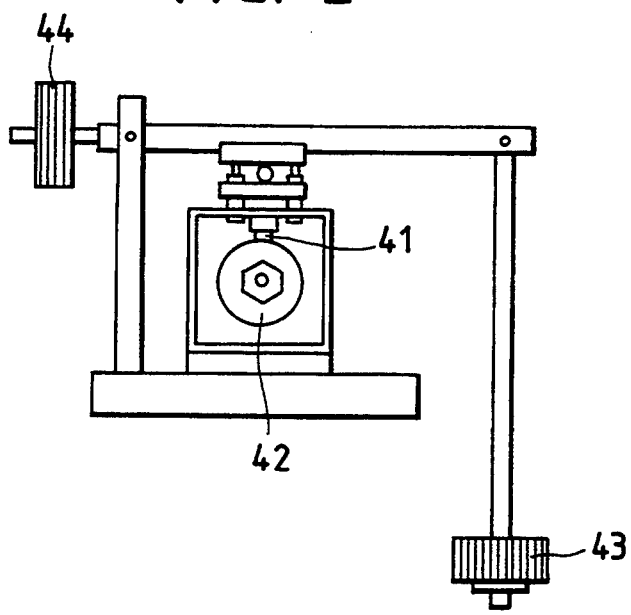
FIG. 2 is a diagram outlining a saban (phonetic) type wear resistance tester employed in the embodiments of the invention.

Bearing inner races were formed by using a variety of alloy steels whose essential components except Fe are as indicated at No. 1 through No. 34 in the following Tables 1 and 2. As shown in FIG. 1, an inner race cracking life-time test were given to cylindrical roller bearings 1 including the inner races 11 thus formed.

Figure 6:
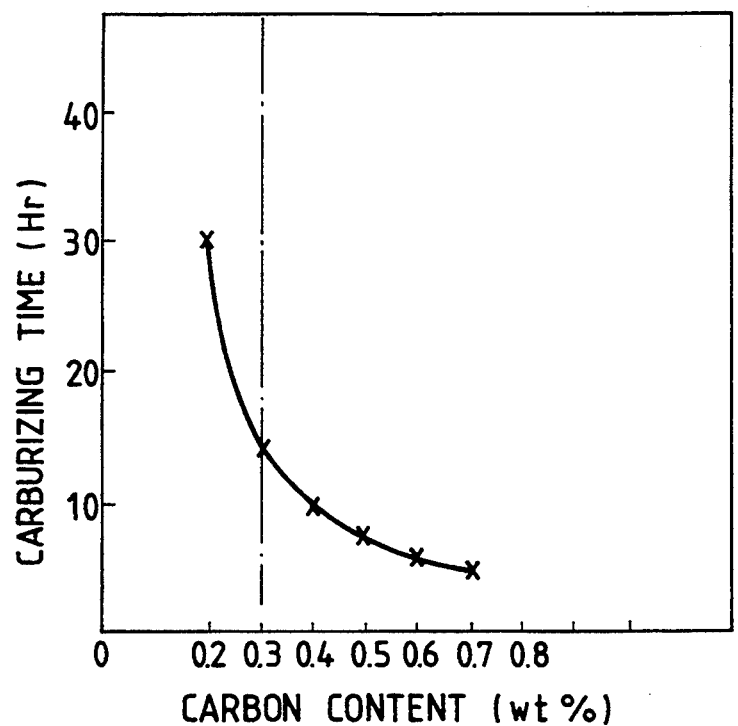
FIG. 6 is a graphical representation indicating the relationships between the carbon contents of alloy steels employed and periods of time required for carburizing them, which are included in the results of evaluation of the specimens in the first embodiment of the invention.

More specifically, each of the inner races formed by using the aforementioned variety of alloy steels was cracked semi-elliptic in the middle of the raceway track as indicated at 2 in FIG. 1. Thereafter, the inner races were carburized, hardened and tempered at temperatures indicated in Tables 1 and 2, and then finished by polishing, to form inner races 11 having tapered inner cylindrical surfaces. In this connection, the heat treatment time periods were as follows: That is, as for the carburizing process with Rx gas, carburizing time periods were as indicated in FIG. 6 in correspondence to the carbon contents of the alloy steels. And the hardening time period was set to 40 minutes, and the tempering time period to 120 minutes.

Each of the inner races 11 thus formed was press-fitted on a tapered shaft 3, to apply a fitting stress (of 200 MPa) to the inner race 11. Under this condition, the tapered shaft 3 was rotated at a speed of 1800 rpm with a radial weight 38000 N. That is, a rolling stress was applied to the raceway track of the inner race 11 to grow the crack 2. Under this condition, the number of revolutions was measured until the inner race 11 was broken axially.

On the other hand, before the inner race cracking life-time test, the carbon content ($C_1$) of the surface layer of the o raceway track of the inner race 11 heat-treated, and the carbon content ($C_2$) of the core of the latter were measured, and the difference $\Delta C = C_1 - C_2$ was calculated, and the compression residual stress of the raceway track of the inner race 11 was measured.

Abrasion testing specimens were fabricated by using the above-described variety of alloy steels, and an abrasion test was given to them on a saban (phonetic) type abrasion tester. More specifically, a stationary specimen 41 and a rotary specimen 42 were made of one and the same alloy steel, and connected to the tester. Thereafter, a weighting weight 43 and a balancing weight 44 were set on the tester, to provide an initial surface pressure of 100 MPa. Under this condition, the rotary specimen 42 was turned 1 m/s with respect to the stationary specimen 41, to detect the degree of abrasion. And, when the specific abrasion loss was $1.5 \times 10^{-7}$ mm$^3$/kgf mm or less, it was determined acceptable.

In addition, the raceway track of the inner race heat-treated was observed under an electron microscope, to detect whether or not large carbides were formed on it.

Figure 3:
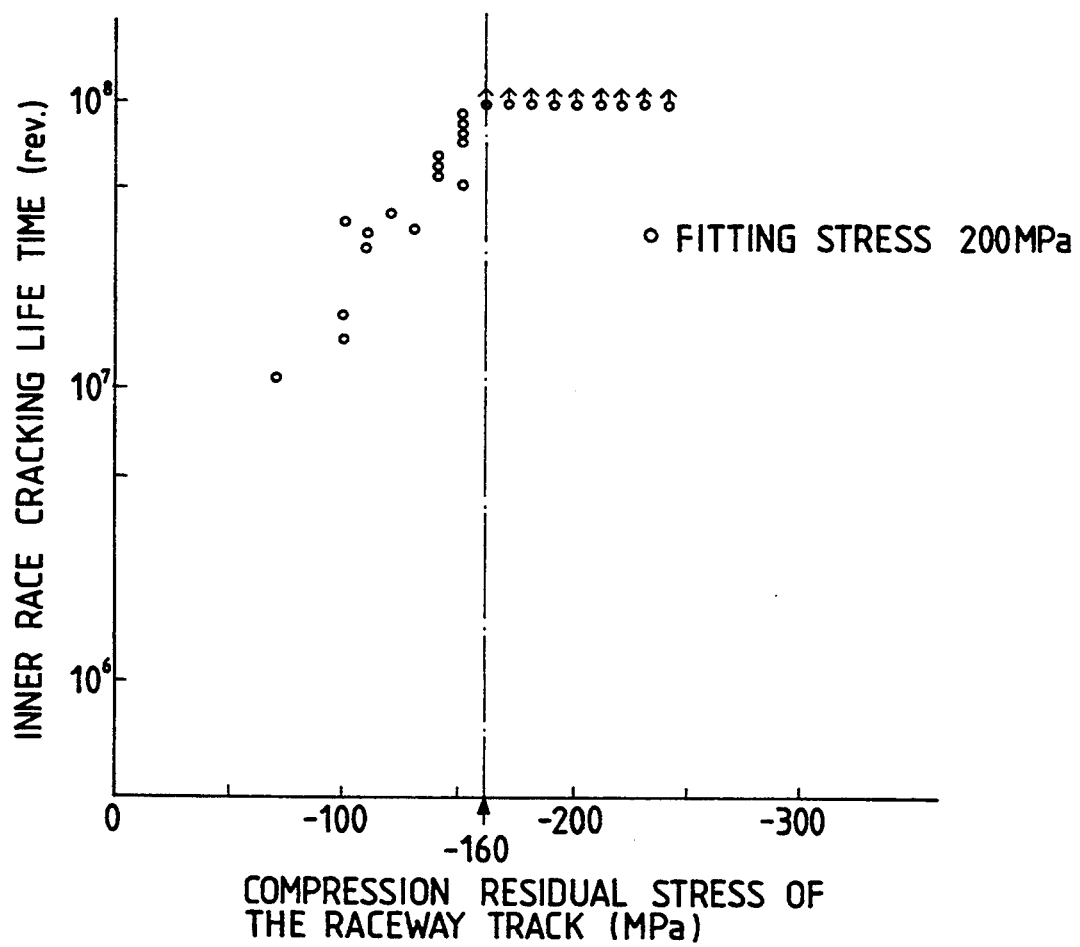
FIG. 3 is a graphical representation indicating the relationships between compression residual stress and cracking life-time, which are included in the results of evaluation of specimens in a first embodiment of the invention.
Figure 4:
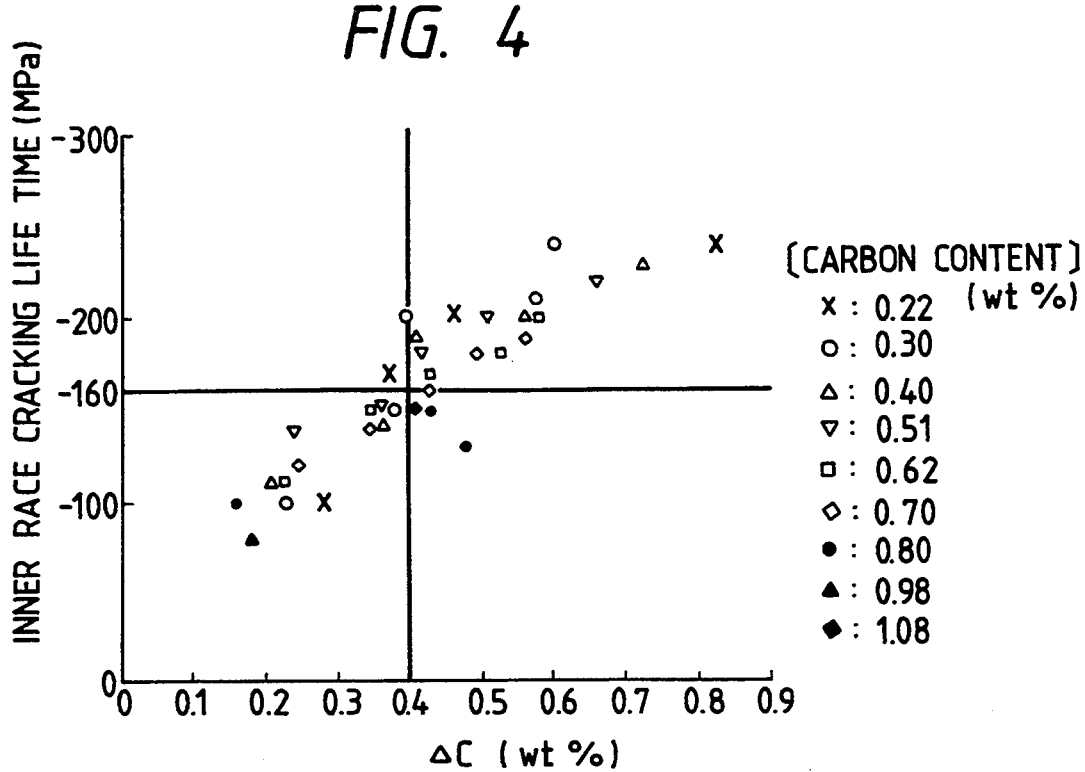
FIG. 4 is a graphical representation indicating the relationships between compression residual stress values and differences $\Delta C$ (between the carbon contents of the surface layers and those of the cores of the specimens) which are included in the results of evaluation of the specimens in the first embodiment of the invention.
Figure 5:
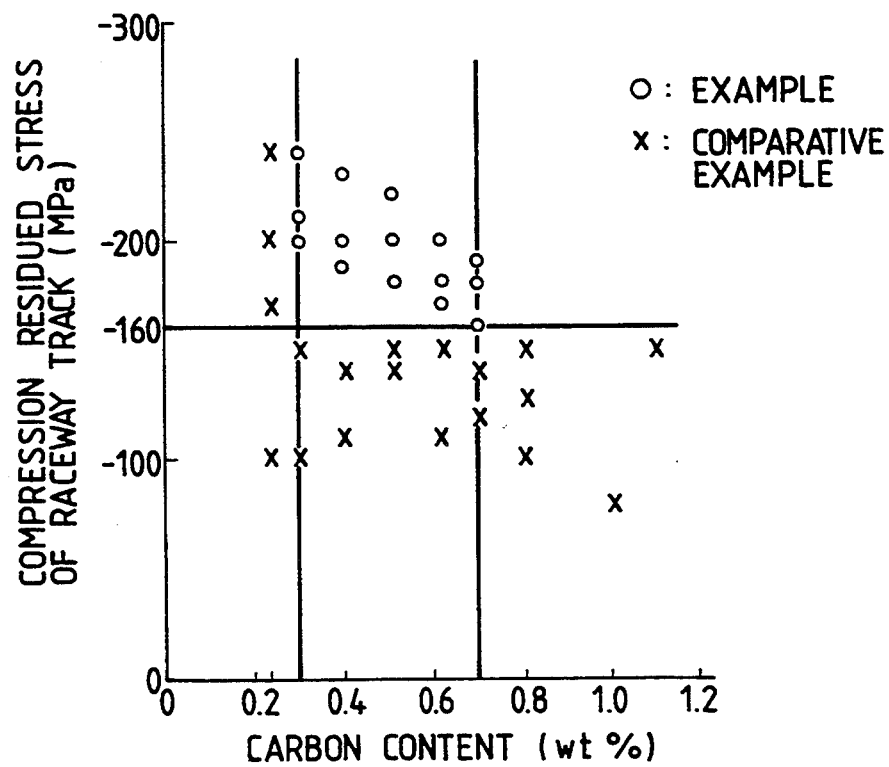
FIG. 5 is a graphical representation indicating the relationships between compression residual stress values and the carbon contents of alloy steels employed, which are included in the results of evaluation of the specimens in the first embodiment of the invention.

The above-described various conditions and test results of concrete examples of the inner race according to the invention are indicated in Table 1, and those of comparison examples of the inner race are indicated in Table 2. The test results are graphically indicated in FIGS. 3, 4 and 5. FIG. 6 indicates periods of time required for carburizing the inner races to a predetermined one and the same depth (C of the surface being 1.0% by weight, and C at a depth of 1 mm being 0.75% by weight) with respect to the carbon contents of the alloy steels.

TABLE 1

| No. | Essential components except Fe of alloy steel (% by wt) | | | | | | | Heat treatment temperature (°C.) | | | | | Wear resist- ance | Pre- sence or absence of large carbide | Compres- sion residual stress (MPa) | Inner race cracking life ($\times 10^6$ rev) |
|---|---|---|---|---|---|---|---|---|---|---|---|---|---|---|---|---|
| | C | Si | Mn | P | S | Cr | O | Car- buriz- ing | Harden- ing | Temper- ing | $C_1$ | $\Delta C$ | | | | |
| 1 | 0.30 | 0.25 | 0.25 | 0.009 | 0.010 | 0.8 | 0.0009 | 930 | 820 | 170 | 0.70 | 0.40 | ○ | absent | −200 | ≧100 |
| 2 | 0.30 | 0.25 | 0.25 | 0.009 | 0.010 | 0.8 | 0.0009 | 930 | 820 | 170 | 0.88 | 0.58 | ○ | absent | −210 | ≧100 |
| 3 | 0.30 | 0.25 | 0.25 | 0.009 | 0.010 | 0.8 | 0.0009 | 930 | 820 | 170 | 1.01 | 0.61 | ○ | absent | −240 | ≧100 |
| 4 | 0.40 | 0.23 | 0.75 | 0.010 | 0.012 | 1.5 | 0.0007 | 930 | 820 | 170 | 0.83 | 0.41 | ○ | absent | −190 | ≧100 |
| 5 | 0.40 | 0.23 | 0.75 | 0.010 | 0.012 | 1.5 | 0.0007 | 930 | 820 | 170 | 0.99 | 0.57 | ○ | absent | −200 | ≧100 |
| 6 | 0.40 | 0.23 | 0.75 | 0.010 | 0.012 | 1.5 | 0.0007 | 930 | 820 | 170 | 1.15 | 0.73 | ○ | absent | −230 | ≧100 |
| 7 | 0.51 | 0.95 | 1.50 | 0.010 | 0.010 | 1.5 | 0.0006 | 930 | 820 | 170 | 0.93 | 0.42 | ○ | absent | −180 | ≧100 |
| 8 | 0.51 | 0.95 | 1.50 | 0.010 | 0.010 | 1.5 | 0.0006 | 930 | 820 | 170 | 1.02 | 0.51 | ○ | absent | −200 | ≧100 |
| 9 | 0.51 | 0.95 | 1.50 | 0.010 | 0.010 | 1.5 | 0.0006 | 930 | 820 | 170 | 1.15 | 0.67 | ○ | absent | −220 | ≧100 |
| 10 | 0.62 | 0.25 | 0.75 | 0.010 | 0.009 | 1.5 | 0.0009 | 930 | 820 | 170 | 1.05 | 0.43 | ○ | absent | −170 | ≧100 |
| 11 | 0.62 | 0.25 | 0.75 | 0.009 | 0.009 | 1.5 | 0.0009 | 930 | 820 | 170 | 1.15 | 0.53 | ○ | absent | −180 | ≧100 |
| 12 | 0.62 | 0.25 | 0.75 | 0.009 | 0.009 | 1.5 | 0.0009 | 930 | 820 | 170 | 1.20 | 0.58 | ○ | absent | −200 | ≧100 |
| 13 | 0.70 | 0.25 | 0.35 | 0.008 | 0.011 | 3.0 | 0.0007 | 930 | 820 | 170 | 1.13 | 0.43 | ○ | absent | −160 | ≧100 |
| 14 | 0.70 | 0.25 | 0.35 | 0.008 | 0.011 | 3.0 | 0.0007 | 930 | 820 | 170 | 1.20 | 0.50 | ○ | absent | −180 | ≧100 |
| 15 | 0.70 | 0.25 | 0.35 | 0.008 | 0.011 | 3.0 | 0.0007 | 930 | 820 | 170 | 1.27 | 0.57 | ○ | absent | −190 | ≧100 |

TABLE 2

| No. | Essential components except Fe of alloy steel (% by wt) | | | | | | | Heat treatment temperature (°C.) | | | | | Wear resist- ance | Pre- sence or absence of large carbide | Compres- sion residual stress (MPa) | Inner race cracking life ($\times 10^6$ rev) |
|---|---|---|---|---|---|---|---|---|---|---|---|---|---|---|---|---|
| | C | Si | Mn | P | S | Cr | O | Car- buriz- ing | Harden- ing | Temper- ing | $C_1$ | $\Delta C$ | | | | |
| 16 | 0.22 | 0.24 | 0.28 | 0.007 | 0.012 | 0.5 | 0.0008 | 930 | 820 | 170 | 0.50 | 0.28 | x | absent | −100 | 18 |
| 17 | 0.22 | 0.24 | 0.28 | 0.007 | 0.012 | 0.5 | 0.0008 | 930 | 820 | 170 | 0.68 | 0.46 | x | absent | −200 | ≧100 |
| 18 | 0.22 | 0.24 | 0.28 | 0.007 | 0.012 | 0.5 | 0.0008 | 930 | 820 | 170 | 1.05 | 0.83 | △ | absent | −240 | ≧100 |
| 19 | 0.22 | 0.24 | 0.28 | 0.007 | 0.012 | 0.5 | 0.0008 | 930 | 820 | 170 | 0.60 | 0.38 | x | absent | −170 | ≧100 |

TABLE 2-continued

| No. | Essential components except Fe of alloy steel (% by wt) | | | | | | | Heat treatment temperature (°C.) | | | $C_1$ | $\Delta C$ | Wear resistance | Presence or absence of large carbide | Compression residual stress (MPa) | Inner race cracking life ($\times 10^6$ rev) |
| | C | Si | Mn | P | S | Cr | O | Carburizing | Hardening | Tempering | | | | | | |
| --- | --- | --- | --- | --- | --- | --- | --- | --- | --- | --- | --- | --- | --- | --- | --- | --- |
| 20 | 0.30 | 0.25 | 0.25 | 0.009 | 0.010 | 0.8 | 0.0009 | 930 | 820 | 170 | 0.52 | 0.22 | ○ | absent | −100 | 39 |
| 21 | 0.30 | 0.25 | 0.25 | 0.009 | 0.010 | 0.8 | 0.0009 | 930 | 820 | 170 | 0.68 | 0.38 | ○ | absent | −150 | 85 |
| 22 | 0.40 | 0.23 | 0.75 | 0.010 | 0.012 | 1.5 | 0.0007 | 930 | 820 | 170 | 0.61 | 0.21 | ○ | absent | −110 | 35 |
| 23 | 0.40 | 0.23 | 0.75 | 0.010 | 0.012 | 1.5 | 0.0007 | 930 | 820 | 170 | 0.77 | 0.37 | ○ | absent | −140 | 65 |
| 24 | 0.51 | 0.95 | 1.50 | 0.010 | 0.010 | 1.5 | 0.0006 | 930 | 820 | 170 | 0.73 | 0.23 | ○ | absent | −140 | 57 |
| 25 | 0.51 | 0.95 | 1.50 | 0.010 | 0.010 | 1.5 | 0.0006 | 930 | 820 | 170 | 0.90 | 0.37 | ○ | absent | −150 | 74 |
| 26 | 0.62 | 0.25 | 0.75 | 0.009 | 0.009 | 1.5 | 0.0009 | 930 | 820 | 170 | 0.84 | 0.22 | ○ | absent | −110 | 32 |
| 27 | 0.62 | 0.25 | 0.75 | 0.009 | 0.009 | 1.5 | 0.0009 | 930 | 820 | 170 | 0.97 | 0.35 | ○ | absent | −150 | 80 |
| 28 | 0.70 | 0.25 | 0.35 | 0.008 | 0.011 | 3.0 | 0.0007 | 930 | 820 | 170 | 0.95 | 0.25 | ○ | absent | −120 | 41 |
| 29 | 0.70 | 0.25 | 0.35 | 0.008 | 0.011 | 3.0 | 0.0007 | 930 | 820 | 170 | 1.05 | 0.35 | ○ | absent | −140 | 60 |
| 30 | 0.80 | 0.24 | 0.33 | 0.010 | 0.010 | 3.5 | 0.0008 | 930 | 820 | 170 | 0.97 | 0.17 | ○ | present | −100 | 15 |
| 31 | 0.80 | 0.24 | 0.33 | 0.010 | 0.010 | 3.5 | 0.0008 | 930 | 820 | 170 | 1.23 | 0.43 | ○ | present | −150 | 46 |
| 32 | 0.80 | 0.24 | 0.33 | 0.010 | 0.010 | 3.5 | 0.0008 | 930 | 820 | 170 | 1.28 | 0.48 | ○ | present | −130 | 37 |
| 33 | 0.98 | 0.24 | 0.32 | 0.008 | 0.009 | 3.5 | 0.0008 | 930 | 820 | 170 | 1.17 | 0.19 | ○ | present | −70 | 11 |
| 34 | 1.08 | 0.24 | 0.32 | 0.008 | 0.009 | 1.5 | 0.0008 | 930 | 820 | 170 | 1.50 | 0.42 | ○ | present | −150 | 82 |

The inner races formed under the conditions No. 1 through No. 15 in Table 1 corresponding to the concrete examples of the inner race according to the invention were each 160 MPa or larger in compression residual stress absolute value, and were long in inner race cracking life-time, $10^8$ revolutions or higher. That is, they were scarcely cracked. In addition, the inner races were high in wear resistance, and no large carbides were formed on their raceway tracks.

In the comparison examples formed under the conditions No. 16 and No. 19 through 29, the difference $\Delta C$ between the carbon content ($C_1$) of the surface layer of the raceway track and the carbon content ($C_2$) of the core was smaller than those of the concrete examples. The inner races were small in the absolute value of compression residual stress, and short in inner race cracking life-time.

The comparison examples according to the conditions No. 16 through 19 were low in wear resistance, because the chromium contents in the alloy steels were small. Hence, in order to improve the wear resistance, it is preferable to use an alloy steel whose chromium content is at least 0.8% by weight. In addition, the alloy steels of the inner races according to the conditions No. 16 through No. 19 were smaller in carbon content than those of the concrete examples of the invention, and their carburization took relatively long periods of time as indicated in FIG. 6.

In each of the comparison examples according to the conditions No. 30 through No. 34, the alloy steel employed was larger in carbon content than those of the specimens of the invention, and the absolute value of compression residual stress of the raceway track was small, and the inner race cracking life-time is short. Furthermore, in each of the comparison examples according to the conditions No. 30 through No. 33, the amount of chromium contained in the alloy steel was larger, 3.5% by weight, than in others, and therefore large carbides were formed on the raceway track, thus lowering the rolling life of the inner race. With this fact and the abovedescribed wear resistance taken into account, it is preferable that the chromium content of an alloy steel to be used is in a range of from 0.8% to 3.0% by weight.

In the comparison example according to the condition No. 34 in Table 2, the carbon content of the surface layer of the raceway track was larger than in the concrete examples of the invention, and large carbides were formed on the raceway track, thus lowering the rolling life of the inner race, in spite of the amount of chromium contained in the alloy steel being not more than 3.0% by weight.

The second embodiment relates to a rolling bearing which is free from the above-described difficulty, and can be used even under a high fitting stress over 130 MPa, and is shorter in carburizing or carbonitriding time than conventional rolling bearings, and long in service life even when used with a foreign-matter-mixed high-temperature lubricant, and in which the inner race is high in dimensional stability.

A variety of alloy steels whose components except Fe are as indicated at No. 35 through No. 48 in the following Table 3 were used to form bearing inner races, which were 80 mm in inside diameter, 100 mm in outside diameter and 16 mm in width. The inner races thus formed were heat-treated under temperature conditions indicated in Table 3. Thereafter, similarly as in the first embodiment, the inner race cracking life-time test, the compression residual stress measurement, the wear resistance test, and the large carbide observation were performed, with results as indicated in Table 3. In this connection, the heat treatment time periods were as follows: That is, as for the carburizing process with Rx gas, carburizing times were as indicated in FIG. 6 in correspondence to the carbon contents of the alloy steels. And the hardening time period was set to 40 minutes, and the tempering time period to 120 minutes.

In addition, the determination of the amount of residual austenite in the surface layer (100 μm from the surface) of the raceway track of each inner race by X-ray diffraction (the term "the amount of residual austenite" as used herein is intended to mean that in the surface layer of the raceway track), a life-time test with the foreign-matter-mixed high-temperature lubrication, a raceway track's Vickers hardness test, and a dimensional stability test were performed, with results as indicated in the following Table 4.

In view of the cracking life-time and the dimensional stability when the inner race is used under the high temperature, the inner zone as well as the core zone of the inner race (that is, the entire portion of the inner race) should satisfy the condition that the amount of the residual austenite is not more than 4.0 by volume. However, it should be noted that the surface zone is larger than the core zone in the amount of the residual austenite due to the amount of the carbon in the carburizing treatment, so that when the condition of the surface zone is satisfied, it can say that the condition of the entire portion of the inner race is also satisfied under a quality control. Therefore, the amount of the residual austenite was determined by observing the surface zone of the inner race.

The inner races according to the conditions No. 39 and No. 40 were not carburized but carbonitrided with a gas which was prepared by adding 5% $NH_3$ gas to Rx gas. The inner races according to the conditions No. 39, No. 47 and No. 48, after being hardened, were subjected to sub-zero treatment at a temperature of $-80°$ C. and then tempered. The life-time test with the foreign-matter-mixed high-temperature lubricant, and the dimensional stability test were performed as follows:

Life-time Test with Foreign-Matter-Mixed High-Temperature-Lubricant with the foreign-matter-mixed high-temperature lubricant is at least $2.0 \times 10^6$ cycles, the rolling bearing is sufficiently practical in use.

Dimensional Stability Test

Before the test, each of the bearings was held at a temperature of 150° C. for 2,500 hours. Thereafter, the inside diameter of the inner race of the bearing was measured, and the percentage of the difference $\Delta D$ with respect to the diameter D of the inner race measured before the test was employed as a dimension variation rate (%). When the dimension variation rate is within $\pm 0.010\%$, then the dimensional stability is satisfactory, meeting the thermal stability code 27 of ISO Standard.

Figure 7:
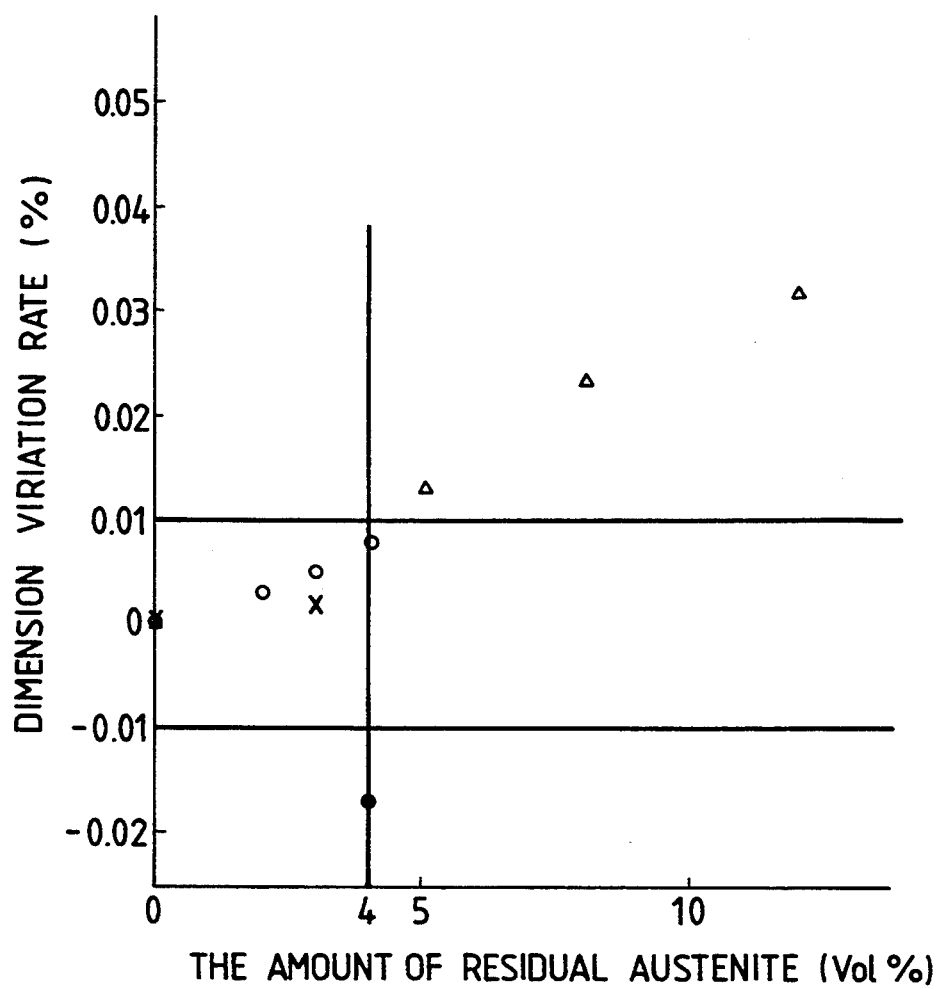
FIG. 7 is a graphical representation indicating the relationships between amounts of residual austenite $\gamma_R$ and dimension variation rates, which are included in the results of evaluation of specimens in a second embodiment of the invention.
Figure 8:
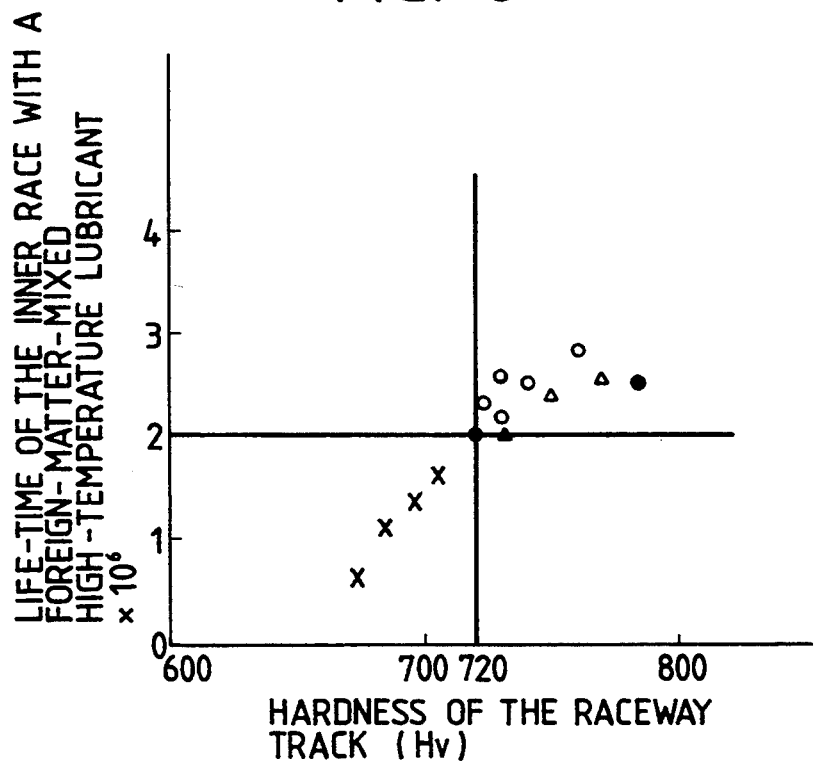
FIG. 8 is a graphical representation indicating the relationships between the hardness of the raceway tracks of inner races and the life-time of the inner races with a foreign-matter-mixed high-temperature lubricant, which are included in the results of evaluation of the specimens in the second embodiment of the invention.

With respect to the test results, FIG. 7 shows the amounts of residual austenite $\gamma_R$ in the surface layers of the raceway tracks of the inner races with the dimensional variation rates, and FIG. 8 shows the hardness of the raceway tracks with the life-time with the foreign-matter-mixed high-temperature lubricant.

TABLE 3

| No. | Essential components except Fe of alloy steel (% by wt) | | | | | | | Heat treatment temperature (°C.) | | | $C_1$ | $\Delta C$ | Wear resistance | Presence or absence of large carbide | Compression residual stress (MPa) | Inner race cracking life ($\times 10^6$ rev) |
|---|---|---|---|---|---|---|---|---|---|---|---|---|---|---|---|---|
| | C | Si | Mn | P | S | Cr | O | Carburizing | Hardening | Tempering | | | | | | |
| 35 | 0.42 | 0.25 | 1.09 | 0.014 | 0.008 | 2.7 | 0.0008 | 960 | 850 | 230 | 0.95 | 0.57 | o | absent | −230 | ≧100 |
| 36 | 0.42 | 0.25 | 1.09 | 0.014 | 0.008 | 2.7 | 0.0008 | 960 | 850 | 260 | 0.95 | 0.57 | o | absent | −230 | ≧100 |
| 37 | 0.42 | 0.25 | 1.09 | 0.014 | 0.008 | 2.7 | 0.0008 | 960 | 850 | 260 | 0.95 | 0 57 | o | absent | −230 | ≧100 |
| 38 | 0.42 | 0.25 | 1.09 | 0.014 | 0.008 | 2.7 | 0.0008 | 960 | 850 | 280 | 0.95 | 0.57 | o | absent | −230 | ≧100 |
| 39 | 0.42 | 0.25 | 1.09 | 0.014 | 0.008 | 2.7 | 0.0008 | 960* | 850* | 260 | 0.95 | 0.57 | o | absent | −230 | ≧100 |
| 40 | 0.44 | 0.23 | 0.70 | 0.011 | 0.012 | 1.0 | 0.0010 | 960* | 850 | 230 | 1.23 | 0.79 | o | absent | −220 | ≧100 |
| 41 | 0.45 | 0.25 | 1.12 | 0.011 | 0.010 | 0.8 | 0.0008 | 960 | 820 | 180 | 0.90 | 0.45 | o | absent | −200 | ≧100 |
| 42 | 0.45 | 0.25 | 1.12 | 0.011 | 0.010 | 0.8 | 0.0008 | 930 | 820 | 180 | 0.90 | 0.45 | o | absent | −200 | ≧100 |
| 43 | 0.45 | 0.25 | 1.12 | 0.011 | 0.010 | 0.8 | 0.0008 | 930 | 820 | 200 | 0.90 | 0.45 | o | absent | −200 | ≧100 |
| 45 | 0.45 | 0.25 | 1.12 | 0.011 | 0.010 | 0.8 | 0.0008 | 930 | 320 | 220 | 0.90 | 0.45 | o | absent | −200 | ≧100 |
| 46 | 0.45 | 0.25 | 1.12 | 0.011 | 0.010 | 0.8 | 0.0008 | 930 | 820 | 230 | 0.90 | 0.45 | o | absent | −200 | ≧100 |
| 47 | 0.45 | 0.25 | 1.12 | 0.011 | 0.010 | 0.8 | 0.0008 | 930 | 820* | 170 | 0.90 | 0.45 | o | absent | −200 | ≧100 |
| 48 | 0.45 | 0.25 | 1.12 | 0.011 | 0.010 | 0.8 | 0.0008 | 930 | 820* | 230 | 0.90 | 0.45 | o | absent | −200 | ≧100 |

Note:
The mark (*) in the "Carburizing" column means "carbonitriding", and the mark (*) in the "Hardening" column means the fact that the sub-zero treatment is performed after the hardening operation.

Thrust bearings including races (No. 35–48) made of the same materials with same heat-treatment as the above-described different inner races (No. 35–48), respectively, were fabricated, and mounted on the thrust type life tester described in the publication "Special Steel Handbook", first edition (edited by Denki Seikoh Kenkyuujo, published by Rikohgakusha, May 25, 1969) pp. 10 to 12, and the life test with the foreign matter-mixed lubricant was given to them and $L_{10}$ lifes were measured under the following conditions:

Mixed foreign matter:
Iron powder 100 μm in average grain size
$H_R$ C; 52
Mixing rate; 100 ppm
Lubricant:
High temperature turbine oil
Mobile Sekiyu (Co. Ltd.) Jet Oil II (corresponding to MIL-L-23699C)
Weight condition: $P_{max}$=4900 MPa
Bearing speed: 1000 rpm
Test temperature: 130° C.

That is, the life-time test was given to ten bearings per each group of thrust bearings including the same race, and the number of revolutions (cycles) until flaking occurred with 10% of the bearings from the short life side was measured according to the Weibull distribution function. The number of revolutions thus measured was regarded as the life-time thereof. When the life-time

TABLE 4

| No. | Residual austenite (vol %) | Hardness (Hv) | Lift-time with foreign-matter-mixed high-temperature lubricant (cycle) | Dimensional variation rate (%) |
|---|---|---|---|---|
| 35 | 4.0 | 740 | $2.5 \times 10^6$ | 0.008 |
| 36 | 3.0 | 730 | $2.6 \times 10^6$ | 0.005 |
| 37 | 2.0 | 730 | $2.2 \times 10^6$ | 0.003 |
| 38 | 0 | 720 | $2.0 \times 10^6$ | 0 |
| 39 | 0 | 760 | $2.8 \times 10^6$ | 0 |
| 40 | 2.0 | 725 | $2.3 \times 10^6$ | 0.003 |
| 41 | 13.0 | 770 | $2.6 \times 10^6$ | 0.032 |
| 42 | 8.0 | 750 | $2.4 \times 10^6$ | 0.023 |
| 43 | 5.0 | 730 | $2.0 \times 10^6$ | 0.013 |
| 44 | 3.0 | 695 | $1.4 \times 10^6$ | 0.002 |
| 45 | 0 | 685 | $1.2 \times 10^6$ | 0 |
| 46 | 0 | 675 | $0.6 \times 10^6$ | 0 |
| 47 | 4.0 | 785 | $2.5 \times 10^6$ | −0.017 |
| 48 | 0 | 705 | $1.6 \times 10^6$ | 0 |

In the second embodiment, the inner races were formed according to the conditions No. 35 through No. 48 of Table 3. That is, in each of the inner races, the components of the alloy steel, the carbon content $C_1$ in the surface layer of the raceway track thereof, and the difference $\Delta C$ between the carbon content in the surface layer and that in the core were within those of the inner races according to the invention; however, those inner races were different in the amount of residual austenite and in raceway track hardness from one another. On the other hand, research was conducted on those inner races for the life-time with the foreign-matter-mixed high-temperature lubricant and the dimensional stability of the inner races depending on the differences in the amount of residual austenite and in hardness.

As is apparent from Table 3, the inner races formed according to the conditions No. 35 through No. 48 were 160 MPa or higher in the absolute value of compression residual stress, and long in inner race cracking life-time, at least $10^8$ revolutions, thus being hardly cracked. In addition, those inner races were high in wear resistance, and formed no large carbides on the raceway tracks.

In addition, as is seen from Tables 3 and 4, in the cases of the inner races formed according to the conditions No. 35 through No. 38, they were carburized at a temperature of 960° C., hardened at a temperature of 850° C., and tempered at temperatures of 230° C., 260° C. and 280° C., respectively, so that they were ranged from Hv 720 to 740 in raceway track hardness, and from 0 to 4.0 vol % in the amount of residual austenite. As a result, their life-time with the foreign-matter-mixed high-temperature lubricant was long, over $2.0 \times 10^6$ cycles, and their dimensional variation rates were low, under 0.01%.

The inner race according to the condition No. 39 was carbonitrided at a temperature of 960° C., hardened at a temperature of 850° C. subjected to sub-zero treatment, and then tempered at a temperature of 260° C., so that the raceway track hardness was set to Hv 760, and the amount of residual austenite was set to zero (0). As a result, the inner race had a long life-time of $2.8 \times 10^6$ cycles with the foreign-matter-mixed high-temperature lubricant, and was zero (0) in dimension variation rate, thus being high in dimensional stability.

The inner race according to the condition No. 40 was carbonitrided at a temperature of 960° C., hardened at a temperature of 850° C., and then tempered at a temperature of 230° C., so that the raceway track hardness was set to Hv 725, and the amount of residual austenite was 2.0 vol %. As a result, the life-time with the foreign-matter-mixed high-temperature lubricant was increased to $2.3 \times 10^6$ cycles, and the dimension variation rate was suppressed to 0.003%.

On the other hand, the inner races according to the conditions No. 41 through No. 43 were carburized at a temperature of 930° C., hardened at a temperature of 820° C., and then tempered at relatively low temperatures of 180° C. to 220° C., so that the raceway track hardness was set to Hv 730 to 770, and the amounts of residual austenite were set to 5.0 to 13.0 vol %. As a result, the life-time of the inner races with the foreign-matter-mixed high-temperature lubricant was increased to at least $2.0 \times 10^6$ cycles; however, the dimensional variation rate was increased to large values over 0.01%.

The inner races according to the conditions No. 44 through No. 46 were carburized at a temperature of 930° C., hardened at a temperature of 820° C., and then tempered at relatively high temperatures of 230° C. to 260° C., so that the amounts of residual austenite were decreased to 0 to 3.0 vol % whereby the dimension variation rates were decreased to 0.002% or less, while the raceway track hardness was decreased to Hv 675 to 695; that is, the life-time of those inner races with the foreign-matter-mixed high-temperature lubricant was decreased to $0.6 \times 10^6$ to $1.4 \times 10^6$ cycles.

The inner race according to the condition No. 47 was carburized at a temperature of 930° C., hardened at a temperature of 820° C., subjected to sub-zero treatment at a temperature of $-80°$ C., and then tempered at a temperature of 170° C., so that the raceway track hardness was set to Hv 785, and the amount of residual austenite was set to 4.0 vol %. As a result, the life-time of the inner race with the foreign-matter-mixed high-temperature lubricant was increased to $2.5 \times 10^6$ cycles; however, the dimension variation rate was increased to a large value, $-0.017\%$, because the martensite was insufficiently tempered at 170° C. although the amount of residual austenite was small 4.0 vol %.

The inner race according to the condition No. 48 was carburized at a temperature of 930° C., hardened at a temperature of 820° C., subjected to sub-zero treatment at a temperature of $-80°$ C., and then tempered at a temperature of 230° C., so that the raceway track hardness was set to Hv 705, and the amount of residual austenite was set to zero (0) vol % As a result the dimension variation rate was set to zero; that is, the dimensional stability was high; however, the life-time of the inner race with the foreign-matter-mixed high-temperature lubricant was short, $1.6 \times 10^6$ cycles.

As is apparent from FIG. 7, when the amount of residual austenite $\gamma_R$ is 4.0 vol % or less, the dimension variation rate is within $\pm 0.010\%$, and the dimensional stability is satisfactory, meeting the thermal stability code 27 of ISO Standard. In FIG. 7, the mark ⊙ corresponds to the resultant inner race according to the condition No. 47. That is, the amount of residual austenite $\gamma_R$ was smaller than 4.0 vol %; however the tempering temperature was low, 170° C., and therefore the martensite was insufficiently tempered, so that the dimensional contraction with time occurred.

As is seen from FIG. 8, when the hardness is equal to or larger than Hv 720, the life-time with the foreign-matter-mixed high-temperature lubricant is $2.0 \times 10^6$ cycles or more which is large enough for the rolling bearing in practical use.

If summarized, those results reveal the following fact: That is, the rolling bearing in which at least the inner race is formed by carburizing or carbonitriding an alloy steel whose carbon content is ranged from 0.3 to 0.7% by weight, and the carbon content ($C_1$) of the surface layer of the raceway track of the inner race is at most 1.3% by weight, and the difference ($\Delta C = C_1 - C_2$) between the carbon content ($C_1$) of the surface layer and the carbon content ($C_2$) of the core of the inner race is at least 0.4% by weight, and in which the inner race is tempered at a temperature ranged from 230° C. to 280° C., so that the amount of residual austenite in the surface layer of the raceway track is 4.0 vol% or less, and the hardness of the raceway track is ranged from Hv 720 to Hv 760, can be satisfactorily operated under a high fitting stress over 130 MPa, and can be carburized or carbonitrided more quickly than the conventional one. Furthermore, in the rolling bearing, the inner race is high in dimensional stability and long in the life-time with foreign-matter-mixed high-temperature lubricant.

When the tempering temperature is higher the upper limit 280° C., then it is difficult to keep the lower limit Hv 720 for the raceway track hardness with the above-described materials of the invention. The upper limit of the raceway track hardness, Hv 760, has been selected, because it is difficult to exceed the hardness Hv 760 with the materials of the invention.

As was described above, in the rolling bearing according to the invention, the carbon content of the steel forming the inner race, the carbon content $C_1$ of the surface layer of the raceway track of the inner race, and the difference $\Delta C$ between the carbon content $C_1$ of the surface layer and that $C_2$ of the core of the inner race are suitably determined. Hence, the inner race operates satisfactorily even under a high fitting stress over 130 MPa. In addition, the inner race can be carburized or carbonitrided more quickly than the conventional one.

Therefore, middle and large bearings, which require a deeper carburized layer, can be improved in productivity.

In addition, the rolling bearing according to the second aspect of the present invention in which the inner race is tempered at a temperature ranged from 230° C. to 280° C., so that the amount of residual austenite in the surface layer of the raceway track is 4.0% or less, and the hardness of the raceway track is ranged from Hv 720 to Hv 760, can be satisfactorily operated under a high fitting stress over 130 MPa, and can be carburized or carbonitrided more quickly than the conventional one. Furthermore, in the rolling bearing, the inner race is high in dimensional stability and long in the life-time with foreign-matter-mixed high-temperature lubricant.

While several specific embodiments of the present invention have been described, variations thereto will occur to those skilled in the art within the scope of the inventive concepts which are defined by the appended claims.

What is claimed is:

1. A rolling bearing including an inner race which is used with a fitting stress applied between bore of said inner race and shaft, wherein said inner race is formed by an alloy steel whose carbon content is ranged from 0.3 to 0.7% by weight;

said inner race is subjected to a carburizing or carbonitriding treatment; and said inner race having the difference ($\Delta C = C_1 - C_2$) between the carbon content ($C_1$) of the surface layer of the raceway track of said inner race and the carbon content ($C_2$) of the core of said inner race being at least 0.4% by weight.

2. A rolling bearing according to claim 1, in which the absolute value of compression residual stress of said inner race is not less than 160 MPa.

3. A rolling bearing according to claim 2, in which the amount of residual austenite of said inner race is not more than 4.0 vol %.

4. A rolling bearing according to claim 2, in which the carbon content ($C_1$) of the surface layer of the raceway track of the inner race is at most 1.3% by weight, and said alloy steel contains the chromium content in a range of from 0.8% to 3.0% by weight.

5. A rolling bearing according to claim 4, in which the hardness of the raceway track is ranged from Hv 720 to Hv 760.

6. A rolling bearing according to claim 1, in which the carbon content ($C_1$) of the surface layer of the raceway track of the inner race is at most 1.3% by weight, and said alloy steel contains the chromium content in a range of from 0.8% to 3.0% by weight.

7. A rolling bearing according to claim 3, in which the hardness of the raceway track is ranged from Hv 720 to Hv 760.

8. A rolling bearing according to claim 1, in which the amount of residual austenite of said inner race is not more than 4.0 vol %.

* * * * *